United States Patent
Kang et al.

(10) Patent No.: US 8,624,821 B2
(45) Date of Patent: Jan. 7, 2014

(54) LIQUID CRYSTAL DISPLAY DEVICE AND FABRICATING METHOD AND DRIVING METHOD THEREOF

(75) Inventors: Hee Kwang Kang, Seoul (KR); Kyo Seop Choo, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 852 days.

(21) Appl. No.: 11/637,096

(22) Filed: Dec. 12, 2006

(65) Prior Publication Data

US 2007/0296685 A1  Dec. 27, 2007

(30) Foreign Application Priority Data

Jun. 23, 2006  (KR) .................. 10-2006-0056744

(51) Int. Cl.
*G09G 3/36* (2006.01)
(52) U.S. Cl.
USPC .......................................... 345/102; 345/99
(58) Field of Classification Search
USPC .................................................. 345/99, 102
See application file for complete search history.

(56) References Cited

U.S. PATENT DOCUMENTS

| | | | |
|---|---|---|---|
| 2003/0179192 A1* | 9/2003 | Allen et al. ................... | 345/207 |
| 2004/0051691 A1* | 3/2004 | Hedrick ........................ | 345/102 |
| 2005/0082968 A1* | 4/2005 | Choi et al. .................... | 313/506 |
| 2005/0275616 A1* | 12/2005 | Park et al. ..................... | 345/102 |
| 2006/0192749 A1* | 8/2006 | Lowles et al. ................ | 345/102 |
| 2006/0209006 A1* | 9/2006 | Eckhardt ...................... | 345/102 |
| 2006/0214896 A1* | 9/2006 | Yamada et al. ................ | 345/88 |
| 2006/0238517 A1* | 10/2006 | King et al. .................... | 345/173 |

\* cited by examiner

*Primary Examiner* — Jonathan Boyd
(74) *Attorney, Agent, or Firm* — McKenna, Long & Aldridge, LLP.

(57) ABSTRACT

Disclosed is a liquid crystal display device, a fabricating method, and a driving method thereof that includes at least one integrated photosensor that senses external light illumination on the liquid crystal display device. A sensing signal from the at least one photosensors are converted into a digital signal that is stored to represent an external illumination distribution. The liquid crystal display device includes a backlight that has a plurality of light sources that may be independently driven. A controller generates a control signal that independently drives the light sources in a manner corresponding to the illumination distribution. In doing so, areas of the liquid crystal display device may be provided with a greater amount of light from a corresponding light source so that externally illuminated areas of the liquid crystal display device do not suffer from reduced contrast.

12 Claims, 26 Drawing Sheets

| 0 | 0 | 0 | 0 | 0 | 1 | 1 | 1 | 1 | 1 |
|---|---|---|---|---|---|---|---|---|---|
| 0 | 0 | 0 | 0 | 0 | 1 | 1 | 1 | 1 | 1 |
| 0 | 0 | 0 | 0 | 0 | 1 | 1 | 1 | 1 | 1 |
| 0 | 0 | 0 | 0 | 0 | 1 | 1 | 1 | 1 | 1 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

~206

LIQUID CRYSTAL DISPLAY DEVICE AND FABRICATING METHOD AND DRIVING METHOD THEREOF

This application claims the benefit of Korean Patent Application No. P2006-056744 filed in Korea on Jun. 23, 2006, which is hereby incorporated by reference.

BACKGROUND OF THE INVENTION

1. Field of the Invention

This invention relates to a liquid crystal display device. More particularly, the invention relates to a liquid crystal display device, a fabricating method, and a driving method thereof that improve visibility and reduce power consumption as well as reduce fabricating costs.

2. Description of the Related Art

Generally, a liquid crystal display device LCD controls light transmittance of liquid crystal cells in accordance with video signals to display a picture. Such an LCD implementation typically includes an active matrix type LCD having a switching device for each cell. Such LCD display devices are used as computer monitors, office equipment, cellular phones and the like. The switching device for the active matrix LCD mainly employs an array of thin film transistors (hereinafter, referred to as "TFTs").

FIG. 1 illustrates a related art LCD driving apparatus.

Referring to FIG. 1, the related art LCD driving apparatus includes a liquid crystal display panel 52 having m×n liquid crystal cells Clc arranged in a matrix type, m data lines D1 to Dm and n gate lines G1 to Gn crossing each other and thin film transistors TFT provided at the crossings, a data driver 64 for applying data signals to the data lines D1 to Dm of the liquid crystal display panel 52, a gate driver 66 for applying scanning signals to the gate lines G1 and Gn, a gamma voltage supplier 68 for supplying the data driver 64 with gamma voltages, a timing controller 60 for controlling the data driver 64 and the gate driver 66 using synchronizing signals from a system 70, a direct current to direct current converter 74 (hereinafter a "DC/DC converter") for generating voltages supplied to the liquid crystal display panel 52 using a voltage from a power supply 62, and an inverter 76 for driving a back light 78.

The system 70 applies vertical/horizontal synchronizing signals Vsync and Hsync, clock signals DCLK, a data enable signal DE, and R, G and B data signals to the timing controller 60.

The liquid crystal display panel 52 includes a plurality of liquid crystal cells Clc arranged in a matrix at the crossings of the data lines D1 to Dm and the gate lines G1 to Gn. The thin film transistor TFT provided at each liquid crystal cell Clc applies a data signal from a corresponding data line D1 to Dm to the liquid crystal cell Clc in response to a scanning signal from the gate line G. Further, each liquid crystal cell Clc is provided with a storage capacitor Cst. The storage capacitor Cst is provided between a pixel electrode of the liquid crystal cell Clc and a pre-stage gate line, or between the pixel electrode of the liquid crystal cell Clc and a common electrode line, to thereby maintain a constant voltage on the liquid crystal cell Clc.

The gamma voltage supplier 68 applies a plurality of gamma voltages to the data driver 64.

The data driver 64 converts R, G, and B digital video data into analog gamma voltages (i.e., data signals) corresponding to gray level values in response to a control signal CS from the timing controller 60, and applies the analog gamma voltages to the data lines D1 to Dm.

The gate driver 66 sequentially applies a scanning pulse to the gate lines G1 to Gn in response to a control signal CS from the timing controller 60 to thereby select horizontal lines of the liquid crystal display panel 52 supplied with the data signals from data driver 64.

The timing controller 60 generates the control signals CS for controlling the gate driver 66 and the data driver 64 using the vertical/horizontal synchronizing signals Vsync and Hsync and the clock signal DCLK input from the system 70. Herein, the control signal CS for controlling the gate driver 66 includes a gate start pulse GSP, a gate shift clock GSC and a gate output enable signal GOE, etc. Further, the control signal CS for controlling the data driver 64 includes a source start pulse SSP, a source shift clock SSC, a source output enable signal SOE, and a polarity signal POL, etc. The timing controller 60 re-aligns the R, D and B data from the system 70 to apply them to the data driver 64.

The DC/DC converter 74 boosts or drops a 3.3V input voltage from the power supply 62 to generate a voltage supplied to the liquid crystal display panel 52. Such a Dc/DC converter 72 generates a gamma reference voltage, a gate high voltage VGH, a gate low voltage VGL and a common voltage Vcom, etc.

The inverter 76 drives the backlight 78 with the aid of a driving voltage Vin supplied from any one of the power supply 62 and the system 70. The backlight 78 is controlled by the inverter 76 to thereby generate a light and illuminate the liquid crystal display panel 52.

A problem associated with the related art is that light output from the backlight 78 is constant. As such, if ambient light is greater than the panel brightness, panel visibility is reduced. Conversely, if the ambient light is low, then the panel may be overly bright in comparison. This excessive panel brightness in low ambient light conditions leads to unnecessary and excessive power consumption To solve this problem, a technique that senses an external light using a photosensor such as a photodiode, etc., and controls brightness of the backlight 78 by a user's operation in accordance with the photosensor output has been suggested. However, the addition of a separate photosensor increases assembly costs of the LCD panel.

Referring to FIG. 2, a technique that senses the external light 53 using a photosensor and controls brightness of the backlight in accordance with the result adjusts brightness of the backlight supplied to the entire liquid crystal display panel 52. Such related art solutions cannot selectively increase brightness of the backlight at a specific area of the liquid crystal display panel 52. Further, the external light 53 that illuminates a portion of the liquid crystal display panel 52 creates a problem in that the contrast ratio of the illuminated area (hereinafter, referred to as "illumination area") P1, which is illuminated by the external light 53, is reduced relative to the area (hereinafter, referred to as "non-illumination area") P2, which is not illuminated the external light 53.

SUMMARY OF THE INVENTION

The present invention provides a liquid crystal display device, fabricating method, and driving method thereof, that obviates one or more of the aforementioned problems due to limitations of the related art.

Accordingly, one advantage of the present invention is that it improves the contrast ratio of a liquid crystal display device under varying lighting conditions Another advantage of the present invention is that it improves the uniformity of contrast of a liquid crystal display that is subject to uneven illumination by an external light source.

Still another advantage of the present invention is that it reduces the fabrication cost of a liquid crystal display that prevents a degradation of contrast under varying lighting conditions.

In order to achieve these and other objects of the invention, the present invention involves a liquid crystal display device having a TFT array substrate, which comprises a plurality of photo sensing devices formed on the TFT array substrate that sense an external light irradiated into the liquid crystal display panel; an integrated circuit portion that reads out signals corresponding to an illumination distribution by the external light in accordance with a sensing result by each of the photo sensing devices; a backlight having a plurality of light sources that independently supply light to the liquid crystal display panel in accordance with the illumination distribution; and a backlight driver that drives the backlight.

In another aspect of the present invention, the aforementioned and other advantages are achieved by a method of driving a liquid crystal display device, which comprises sensing an external light irradiated onto a liquid crystal display panel using a photo sensing device provided within the liquid crystal display device; measuring an illumination distribution corresponding to the external light in accordance with a result of the sensing by the photo sensing device; and adjusting a light amount supplied to the liquid crystal display panel in accordance with the illumination distribution.

In another aspect of the present invention, the aforementioned and other advantages are achieved by a method of fabricating a liquid crystal display device, which comprises forming a liquid crystal display panel that includes a plurality of photo sensing devices that sense an external light; preparing an integrated circuit portion that reads out a signal corresponding to illumination distribution, wherein the illumination distribution corresponds to a sensing result by the photo sensing devices; and preparing a plurality light sources that independently supply light to the liquid crystal display panel in accordance with the illumination distribution, wherein forming the liquid crystal display panel includes forming a thin film transistor array substrate including the photo sensing device, forming a color filter array substrate, and joining the thin film transistor array substrate with the color filter array substrate It is to be understood that both the foregoing general description and the following detailed description are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings, in which:

FIGS. 10A-14A illustrate an exemplary fabrication process for a thin film transistor array substrate taken along the I-I' line in FIG. 4;

FIGS. 10B-14B illustrate an exemplary fabrication process for a thin film transistor array substrate taken along the II-II' line in FIG. 4; and FIGS. 10C-14C illustrate an exemplary fabrication process for a thin film transistor array substrate taken along the III-III' line in FIG. 4.

DETAILED DESCRIPTION OF THE ILLUSTRATED EMBODIMENTS

Figure 3:
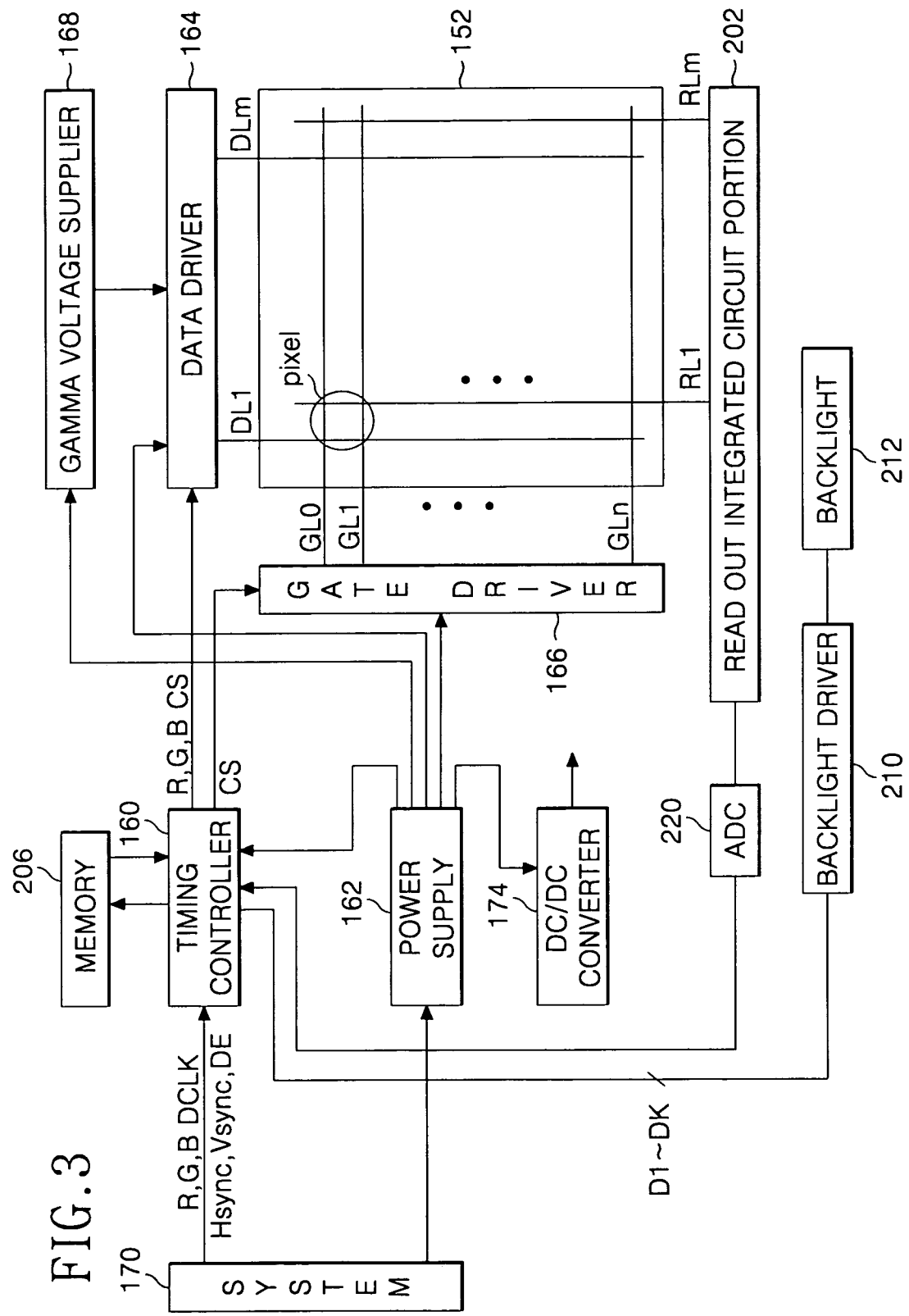
FIG. 3 is a diagram showing a liquid crystal display device according to an embodiment of the present invention.

FIG. 3 is a block diagram schematically illustrating an exemplary a liquid crystal display device according to an embodiment of the present invention. In a liquid crystal display device illustrated in FIG. 3, at least one photosensor is formed along with thin film patterns of the thin film transistor array substrate of the liquid crystal display panel 152. Accordingly, a separate external photodiode is not required. Here, the photosensor is directly formed within the liquid crystal display panel 152 to thereby improve accuracy of the sensor. Also, the amount of light produced by the backlight is selectively spatially increased only at an area of the liquid crystal display panel 152 that is illuminated by an external light source, as sensed by the photosensor, to thereby prevent a decrease in contrast for that illuminated area.

An exemplary configuration and an operation of the liquid crystal display device according to the present invention will be described with reference to FIG. 3 to FIG. 5.

Referring to FIG. 3, a liquid crystal display device of the present invention includes a liquid crystal display device 152, a data driver 164 for supplying a data signal to data lines DL1 to DLm of the liquid crystal display device 152, a gate driver 166 for supplying a scanning signal to gate lines GL1 to GLn, a read-out integrated circuit portion 202 to which read-out lines RL1 to RLm of the liquid crystal display panel 152 are connected, an analog-digital converter (hereinafter, referred to as "ADC") 220 for converting an analog voltage from the read-out integrated circuit portion 202 into a digital signal, a gamma voltage supplier 168 for supplying a gamma voltage to the data driver 164, a timing controller 160 for controlling the data driver 164 and the gate driver 166 using a synchronizing signal supplied from a system 170, a memory 206 connected to the timing controller 160, a DC/DC converter 174 for generating voltages supplied to the liquid crystal display panel 152 using a voltage supplied from a power supply 162, a backlight 212 having light sources that are independently capable of being driven, and a backlight driver 210 for independently driving each of the light sources of the backlight 212.

The system 170 applies vertical/horizontal synchronizing signals Vsync and Hsync, clock signals DCLK, a data enable signal DE, and R, G, B data to the timing controller 160.

The liquid crystal display panel 152 is formed by joining a color filter array substrate including a thin film pattern such as a black matrix, a color filter, etc. to a thin film transistor array substrate including a thin film transistor array, etc., with a liquid crystal between the two substrates. The resulting structure has m×n liquid crystal cells arranged in a matrix.

Figure 4:
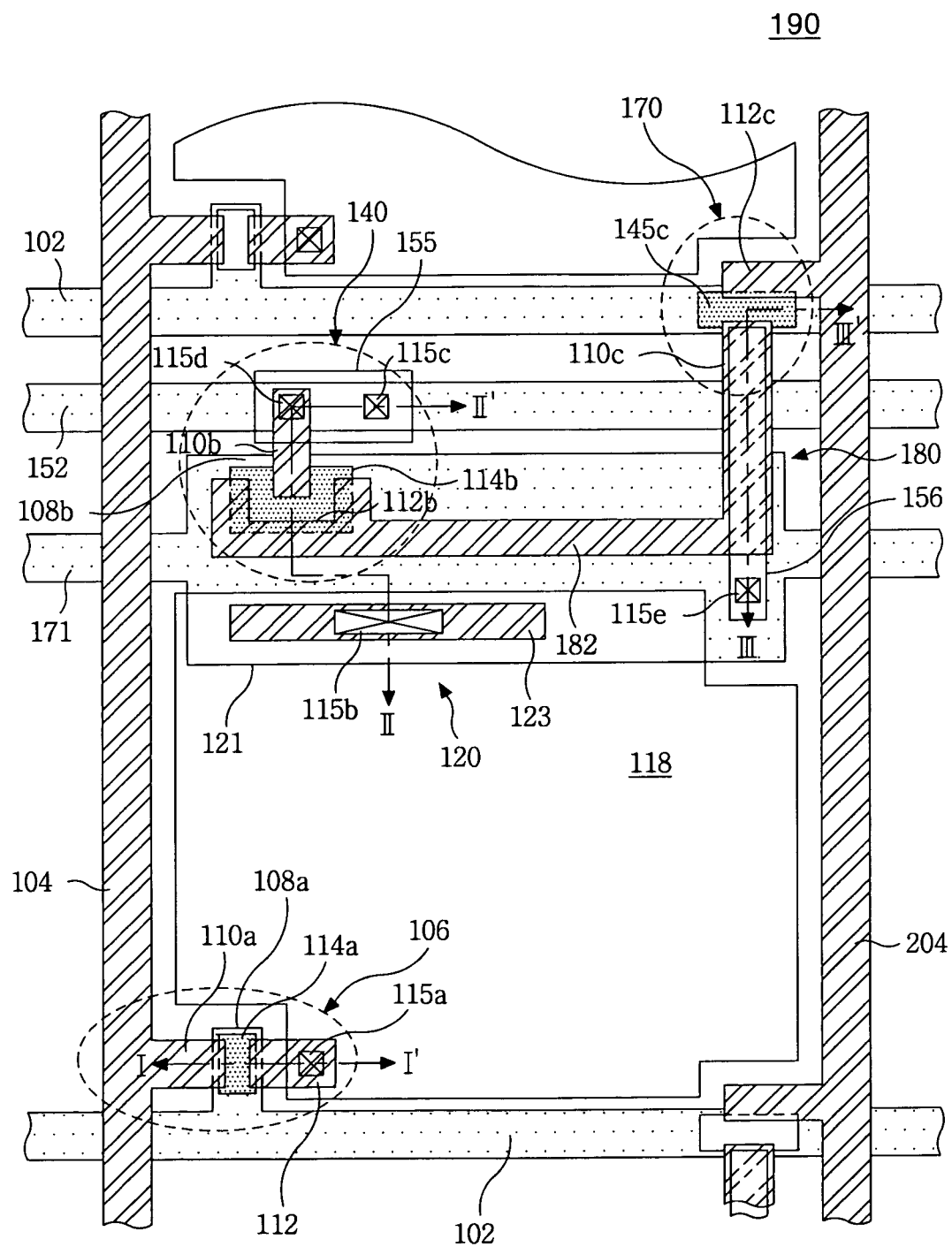
FIG. 4 is a plan view of a thin film transistor array substrate of the liquid crystal display panel illustrated in FIG. 4.
Figure 5A:
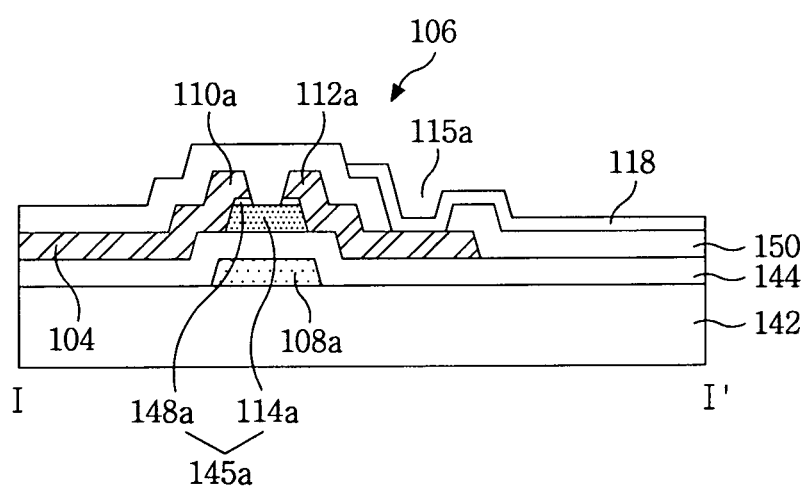
FIG. 5A is a sectional view of the thin film transistor array substrate taken along the I-I' line in FIG. 4.
Figure 5B:
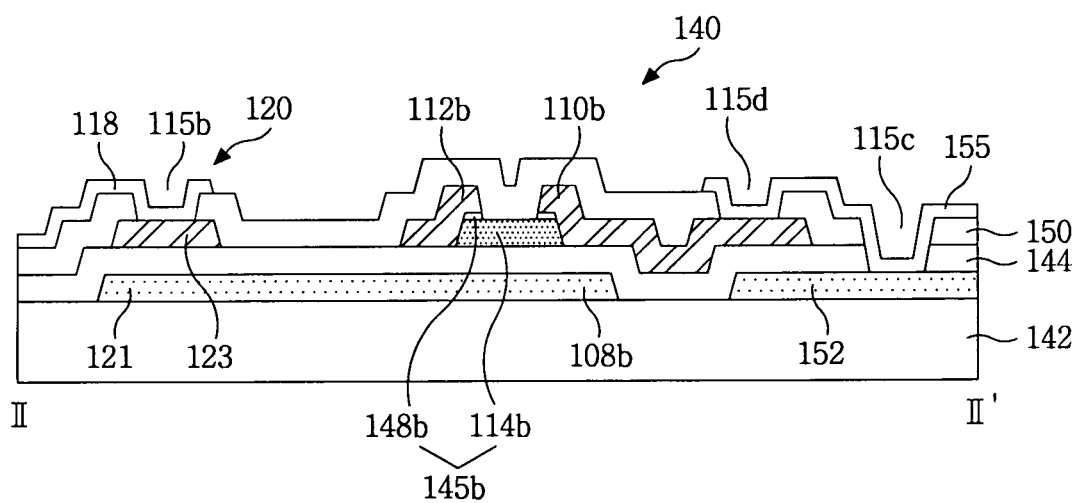
FIG. 5B is a sectional view of the thin film transistor array substrate taken along the II-II' line in FIG. 4.
Figure 5C:
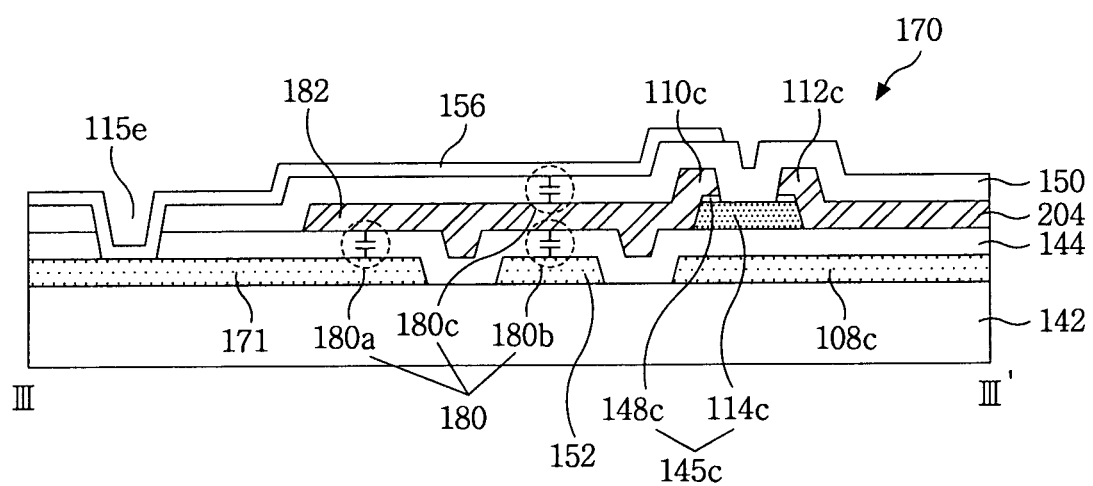
FIG. 5C is a sectional view of the thin film transistor array substrate taken along the III-III' line in FIG. 4.

FIG. 4 is a plan view illustrating a thin film transistor array substrate 190 corresponding to any one of liquid crystal cells in the liquid crystal display panel 152 in FIG. 3. FIGS. 5A-C are sectional views of the thin film transistor array substrate taken along the I-I', II-II' and III-III' lines in FIG. 4, respectively.

Referring to FIGS. 4 and 5A-C, the thin film transistor array substrate 190 includes a gate line 102 and a data line 104 formed in such a manner to cross each other with having a gate insulating film 144 therebetween on a lower substrate 142, and a pixel switching TFT (hereinafter, referred to as "first TFT") 106 provided at each crossing of the gate line 102 and the data line 104. The thin film transistor array substrate 190 further includes a pixel electrode 118 formed at a cell area between the data lines 104 and gate line 102, a read-out line 204 formed parallel to the data line 104 with the pixel electrode 118 between them, and a first and second driving voltage supply line 152 and 171 formed parallel to the gate line 102. Further included is a sensor TFT 140 positioned between the first and second driving voltage supply line 152 and 171, wherein the sensor TFT 140 is supplied with a first and second driving voltage from the first and second driving voltage supply line 152 and 171, respectively. Further included is a switching TFT (hereinafter "second TFT") 170 formed at a crossing of the gate line 102 and the read-out line 204, a pixel data storage capacitor (hereinafter "first storage capacitor") 120 formed at an overlapping portion of the second driving voltage supply line 171 and the pixel electrode 118, and a sensing signal storage capacitor (hereinafter "second storage capacitor") 180 positioned between the second TFT 170 and the sensor TFT 140.

The first TFT 106 includes a gate electrode 108a connected to the gate line 102, a source electrode 110a connected to the data line 104, a drain electrode 112a connected to the pixel electrode 118, and an active layer 114a overlapped with the gate electrode 108a, whereby a channel is formed between the source electrode 110a and the drain electrode 112a. The active layer 114a is formed in such a manner to partially overlap the source electrode 110a and the drain electrode 112a and further includes a channel portion between the source electrode 110a and the drain electrode 112a. An ohmic contact layer 148a for making ohmic contact with the source electrode 110a and the drain electrode 112a is further formed on the active layer 114a. Herein, the active layer 114a and the ohmic contact layer 148a may be referred to as a semiconductor pattern 145a.

The first TFT 106 allows a pixel voltage applied to the data line 104 to be charged into the pixel electrode 118 and maintained in response to a gate signal applied to the gate line 102.

The pixel electrode 118 is connected, via a first contact hole 115a passing through a protective film 150, to the drain electrode 112a of the TFT 106. The pixel electrode 118 generates a potential difference with respect to a common electrode due to the charged pixel voltage. The common electrode may be provided at an upper substrate (not shown), such as a color filter array substrate. This potential difference rotates the liquid crystal molecules positioned between the thin film transistor array substrate and the color filter array substrate due to the liquid crystal's dielectric anisotropy. Light provided by a light source (not shown) is transmitted through the pixel electrode 118, through the liquid crystal, and toward the upper substrate.

The first storage capacitor 120 includes a first lower storage electrode 121 extended from the second driving voltage supply line 171, and a first upper storage electrode 123 overlapped with the first lower storage electrode 121 with the gate insulating film 144 between them. The first upper storage electrode 123 passes through the protective film 150 to connect, via a second contact hole 115b, with the pixel electrode 118.

The first storage capacitor 120 allows a pixel voltage charged in the pixel electrode 118 to be maintained until the next pixel voltage is charged.

The sensor TFT 140 includes a gate electrode 108b extended from the second driving voltage supply line 171, an active layer 114b overlapped with the gate electrode 108b with having the gate insulating film 144 therebetween, a source electrode 110b electrically connected to the active layer 114b and connected to the first driving voltage supply line 152, and a drain electrode 112b opposed to the source electrode 110b. The drain electrode 112b is formed in a "U" shape to create a wide channel area for receiving light.

Also, the sensor TFT 140 includes a third contact hole 115c passing through the protective film 150 and the gate insulating film 144 to partially expose the first driving voltage supply line 152, and a fourth contact hole 115d passing through the protective film 150 to expose the source electrode 110b. The sensor TFT 140 further includes a first transparent electrode pattern 155 contacted, via the third contact hole 115c, with the source electrode 110b and contacted, via the third contact hole 115d, with the first driving voltage supply line 152. The first transparent electrode pattern 155 electrically connects the source electrode 110b with the first driving voltage supply line 152. The active layer 114b is formed in such a manner to partially overlap the source electrode 110b and the drain electrode 112b. The sensor TFT 140 further includes a channel portion between the source electrode 110b and the drain electrode 112b. An ohmic contact layer 148b for making ohmic contact with the source electrode 110b and the drain electrode 112b is further formed on the active layer 114b. Such a sensor TFT 140 plays a role in monitoring an external light incident into the panel. As used herein, to be "contacted with" and to be "connected to" both mean to be in direct contact and electrically connected.

A second storage capacitor 180 may include three or more sub-capacitors. FIG. 5C illustrates a first sub-capacitor 180a of second storage capacitor 180. First sub-capacitor 180a is formed of a second storage electrode 182 and the second driving voltage supply line 171 that overlap each other with the gate insulating film 144 between them. The second sub-capacitor 180b is formed of the second storage electrode 182 and the first driving voltage supply line 152 that overlap each other with the gate insulating film 144 between them. The third sub-capacitor 180c is formed of the second storage electrode 182 and the second transparent electrode pattern 156 that overlap each other with the protective film 150 between them. The second storage electrode 182 is connected to the source electrode 110c of the second TFT 170 and the drain electrode 112b of the sensor TFT 140, respectively. The second transparent electrode pattern 156 is connected to the second driving voltage supply line 171 via a fifth contact hole 115e passing through the gate insulating film 144 and the protective film 150.

Second storage capacitor 180 serves to store a charge by a photo-induced current generated by the sensor TFT 140.

Still referring to FIG. 5C, the second TFT 170 includes a gate electrode 108c, which is a portion of the gate line 102, a source electrode 110c connected to the second storage electrode 182, a drain electrode 112c opposed to the source electrode 110c, and an active layer 114c overlapped with the gate electrode 108c, which form a channel between the source electrode 110c and the drain electrode 112c. The gate electrode 108c of the second TFT 170 is different from the gate electrode 108a of the first TFT 106. In other words, the gate electrode 108a of the first TFT 106 has a shape that protrudes from the gate line 102, but the gate electrode 108c of the second TFT 170 substantially shows a portion of the gate line 102. The active layer 114c is formed in such a manner to partially overlap the source electrode 110c and the drain electrode 112c and further includes a channel portion between the source electrode 110c and the drain electrode 112c. An ohmic contact layer 148c for making ohmic contact with the source electrode 110c and the drain electrode 112c is further formed on the active layer 114c.

Referring back to FIG. 3, the DC/DC converter 174 boosts or drops an input voltage from the power supply 162 to generate a voltage supplied to the liquid crystal display panel 152. Such a DC/DC converter 172 may generate a gamma reference voltage, a gate high voltage VGH, a gate low voltage VGL and a common voltage Vcom.

The gamma voltage supplier 168 applies a plurality of gamma voltages to the data driver 164.

The data driver 164 converts digital R, G, B, video data into analog gamma voltages (i.e., data signals) corresponding to gray level values in response to a control signal CS from the timing controller 160. The data driver 164 applies the analog gamma voltages to the data lines D1 to Dm.

The gate driver 166 sequentially applies a scanning pulse to the gate lines GL1 to GLn in response to a control signal CS from the timing controller 160 to thereby select horizontal lines of the liquid crystal display panel 152 supplied with the data signals.

The readout integrated circuit portion 202 reads a sensing voltage sensed by sensor TFT 140 and supplied to the read-out line 204. Thus, the read-out integrated circuit portion 202 enables a determination of an illumination distribution of the liquid crystal display panel, that is, the illumination areas on the liquid crystal display panel.

The ADC 220 converts an analog sensing voltage from the read-out integrated circuit portion 202 into a digital signal and supplies the converted digital signal to the timing controller 160.

The timing controller 160 generates the control signals CS for controlling the gate driver 166 and the data driver 164 using vertical/horizontal synchronizing signals Vsync and Hsync and a clock signal DCLK input from the system 170. The control signal CS for controlling the gate driver 166 may include a gate start pulse GSP, a gate shift clock GSC and a gate output enable signal GOE, etc. Further, the control signal CS for controlling the data driver 64 may include a source start pulse SSP, a source shift clock SSC, a source output enable signal SOE and a polarity signal POL, etc. The timing controller 160 realigns the R, G, B data from the system 170 to apply them to the data driver 164.

Also, the timing controller 160 supplies a digital data supplied from the ADC 220 to the memory 206 and generates brightness control signals D1-DK at the backlight driver 210 using the illumination distribution data from the memory 206.

The memory 206 stores data corresponding to the spatial distribution of external illumination of the liquid crystal display panel 152. the spatial distribution of external illumination is measured by the plurality of sensor TFTs 140. This data is written to the memory 206 by the timing controller 160. The timing controller 160 retrieves this data (hereinafter the "illumination distribution data") in a frame-like format, for controlling the backlight driver 210.

The backlight driver 210 independently drives a plurality of light sources within the backlight 212 using a backlight driving voltage Vinv supplied from the power supply 162 under the control of the timing controller 160.

Figure 6:
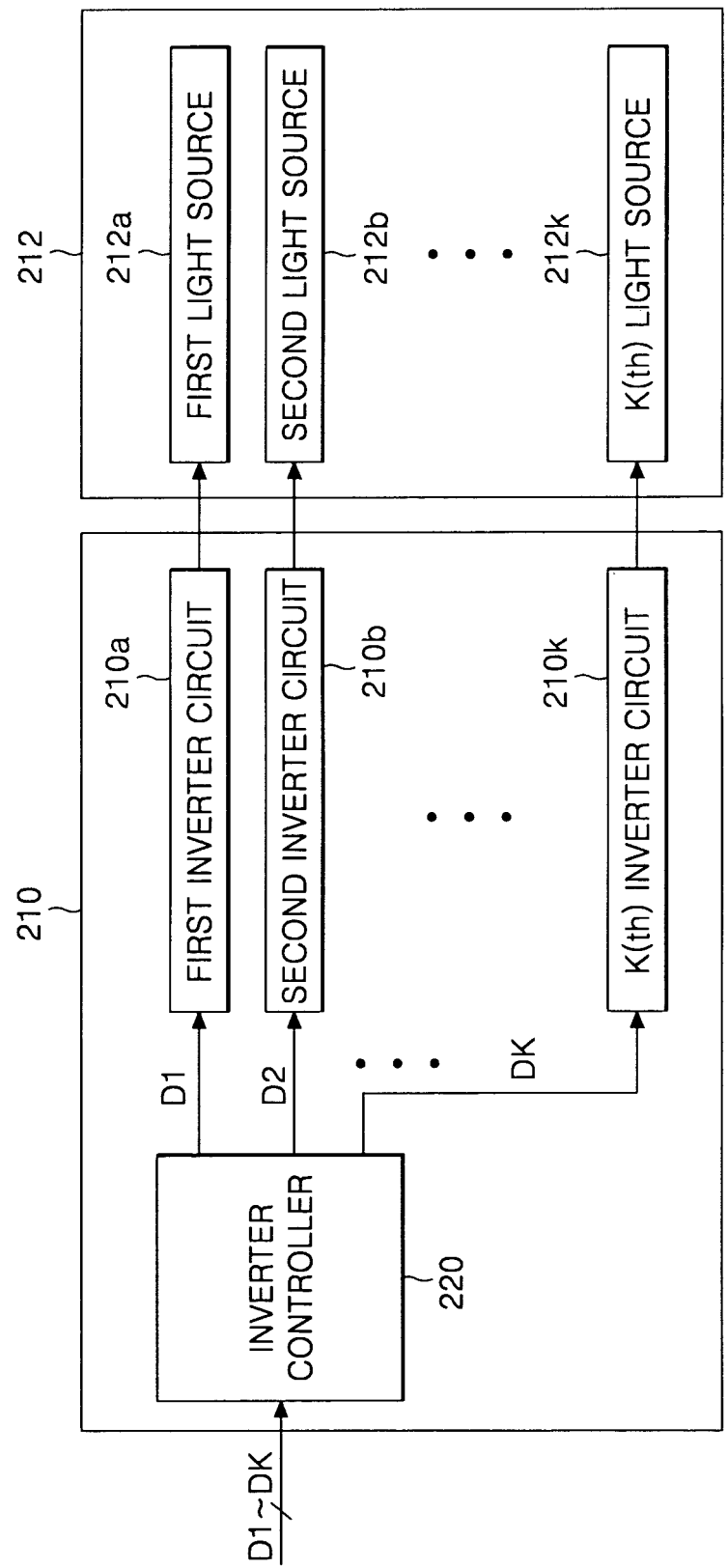
FIG. 6 is a block diagram of an exemplary configuration of a backlight driver and a backlight illustrated in FIG. 4.

Hereinafter, the backlight driver 210 and the backlight 212 will be described in detail with reference to FIG. 6.

The backlight 212 includes a plurality of light sources (1-k), which are arranged in a matrix at a rear side of the liquid crystal display panel 152. Each of the k light sources is capable of being independently driven. Herein, the individual light sources 210a to 212k may include LEDs, fluorescent lamps, etc.

The backlight driver 210 includes a first to a k(th) inverter circuit portions 210a to 212k corresponding to each of the light sources 212a to 210k, and an inverter controller 220 for controlling the first to the k(th) inverter circuit portions 210a to 212k. The inverter controller 220 controls the first to the k(th) inverter circuit portions 210a to 210k using the first to the K(th) brightness control signals D1 to Dk from the timing controller 160.

The backlight driver 210 independently drives the light sources depending upon a illumination distribution by the first to the K(th) brightness control signals D1 to Dk from the timing controller 160. In other words, the inverter controller 220 of the backlight driver 210 supplies more high-level voltage to light sources positioned at an area that is over-lapped with the illumination area P1 illuminated by external light to thereby supply more light to the illumination area of the liquid crystal display panel 152. In doing so, it becomes possible to increase the contrast ratio.

In the liquid crystal display device having such a structure, since a photosensor is integrated within the liquid crystal display panel 152, it is not necessary to add an external photosensor. Thus, cost is reduced.

Furthermore, the liquid crystal display device includes light sources 212a-212k that are independently capable of being driven and are arranged in a matrix formation at the rear side of the liquid crystal display panel 152 to thereby supply a light having a different brightness depending upon the illumination distribution of the liquid crystal display panel 152. Accordingly, brightness of the light sources 212a-212k corresponding to the illumination area P1 of the liquid crystal display panel 152 can be increased to thereby prevent a contrast ratio deterioration of the illumination area P1.

An exemplary process for driving the light sources 212a-212k, based on a light sensing process according to the present invention will be described in detail as follows.

Figure 1:
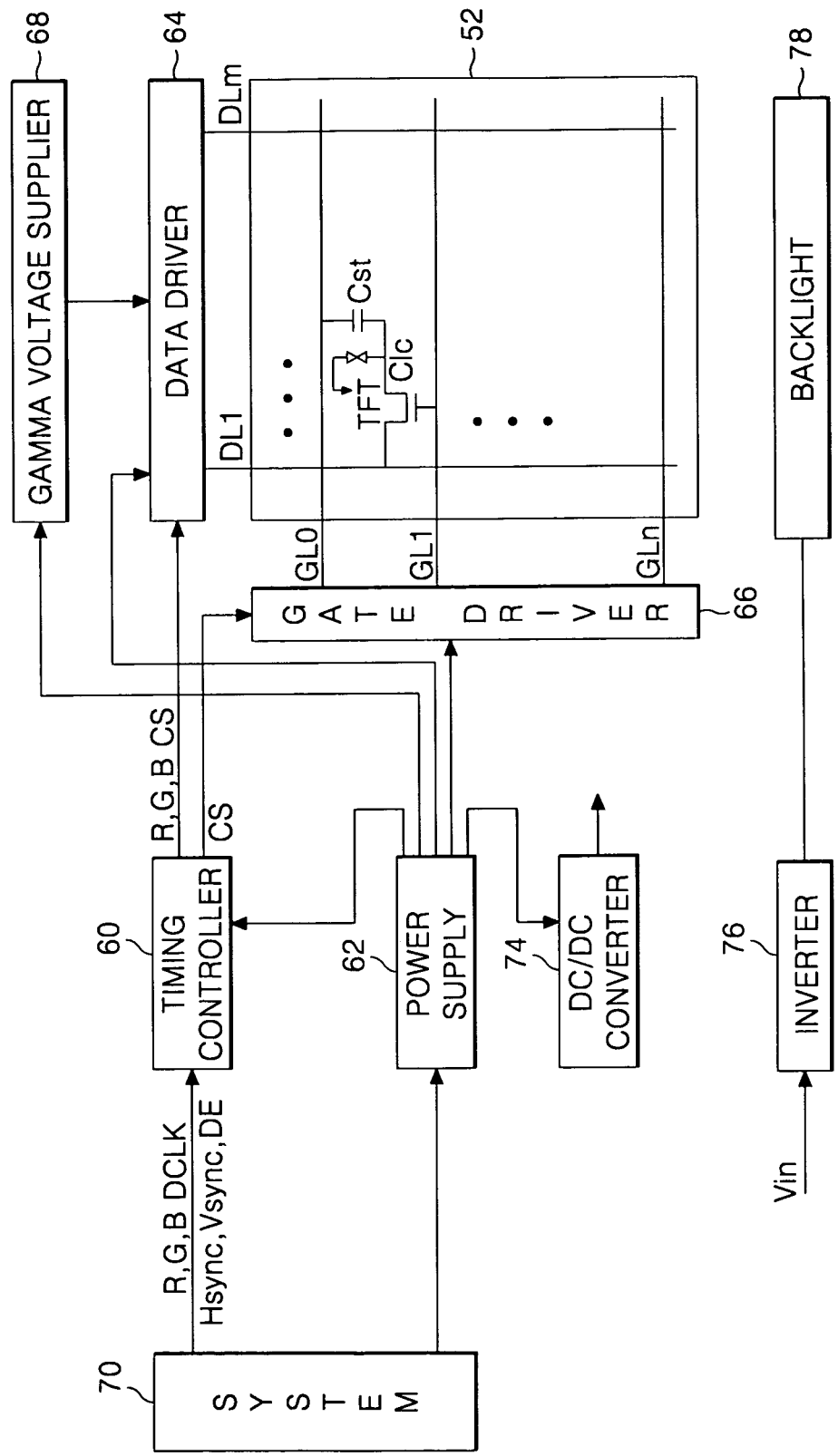
FIG. 1 is a schematic block diagram of a related art liquid crystal display device.
Figure 2:
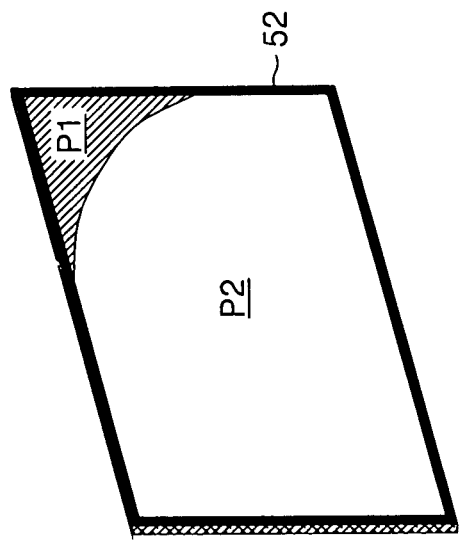
FIG. 2 illustrates an external light irradiating a portion of a liquid crystal display panel.
Figure 7:
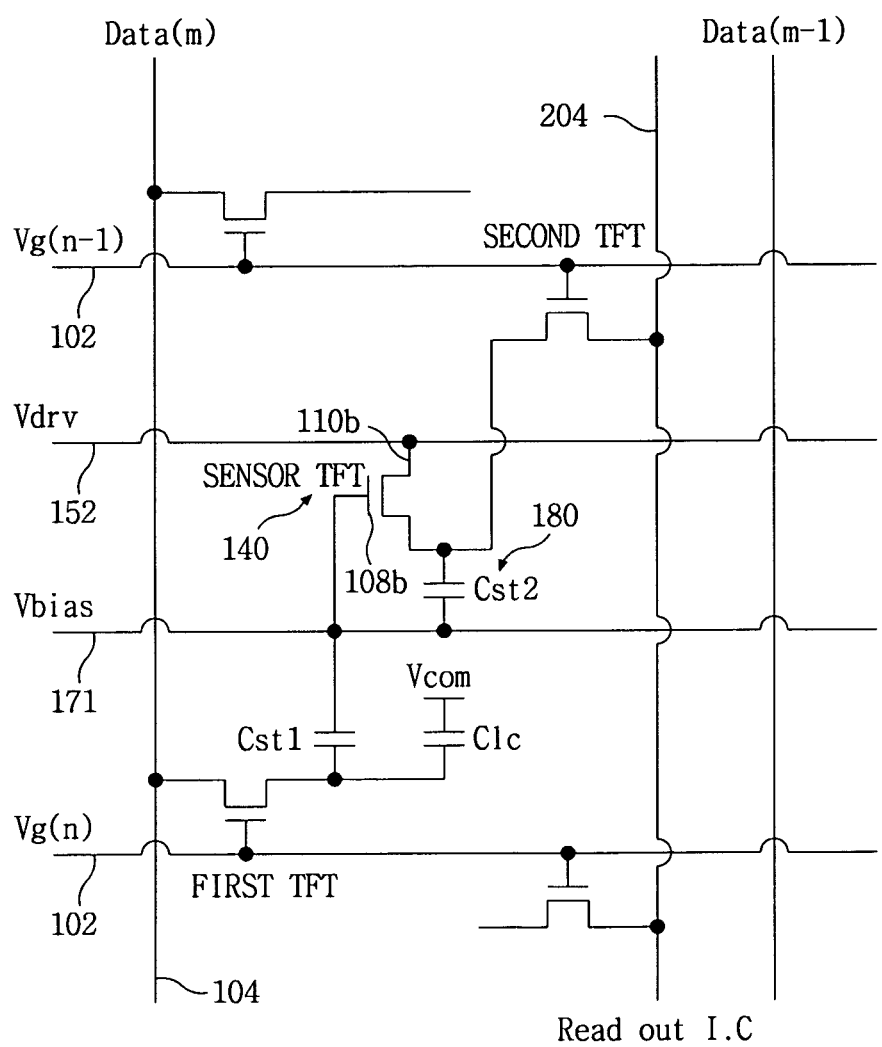
FIG. 7 is a circuit diagram illustrating an exemplary photo sensing component of a liquid crystal display device according to the present invention.

Referring to FIG. 7, if a first driving voltage Vdrv (for example, a voltage of approximately 10V) is applied to the source electrode 110b of the sensor TFT 140, a second driving voltage Vbias (for example, a voltage of approximately −5V) is applied to the gate electrode 108b of the sensor TFT 140 and an external light is irradiated into a portion area of the liquid crystal display panel 152 shown in FIG. 2. Then the irradiated light impinging on the liquid crystal panel is sensed in the active layer 114b of the sensor TFT 140 located at the illumination area P1. Accordingly, a photocurrent, which flows from the source electrode 110b of the sensor TFT 140 to the drain electrode 112b by way of a channel is provided. The photocurrent flows from the drain electrode 112b of the sensor TFT 140 forward the second storage electrode 182. Accordingly, a sensing voltage corresponding to the photocurrent is charged into the second storage capacitor 180 including the first sub-capacitor 180a, which includes the second driving voltage supply line 171 and the second storage electrode 182; the second sub-capacitor 180b, which includes the second storage electrode 182 and the first driving voltage supply line 152; and the third sub-capacitor, 180c, which includes the second storage electrode 182 and the second transparent electrode pattern 156. Thus, the sensing voltage charged into the second storage capacitor 180 is transmitted to the read-out integrated circuit portion 202 by way of the second TFT 170 and the read-out line 204

Accordingly, an analog voltage sensed at the read-out integrated circuit portion 202 is converted, via the ADC 220, into a digital signal, which is supplied to the timing controller 160.

The timing controller 160 supplies the digital signal from the ADC 220 to the memory 206, and the memory 206 stores an illumination distribution data. The illumination distribution data enables the distinguishing of the illumination area P1 from the non-illumination area P2. The illumination area P1 corresponds to the location of sensor TFTs 140 that sensed external light, and the non-illumination area P2 corresponds to the locations of sensor TFTs 140 that did not sense external light.

Figure 8:
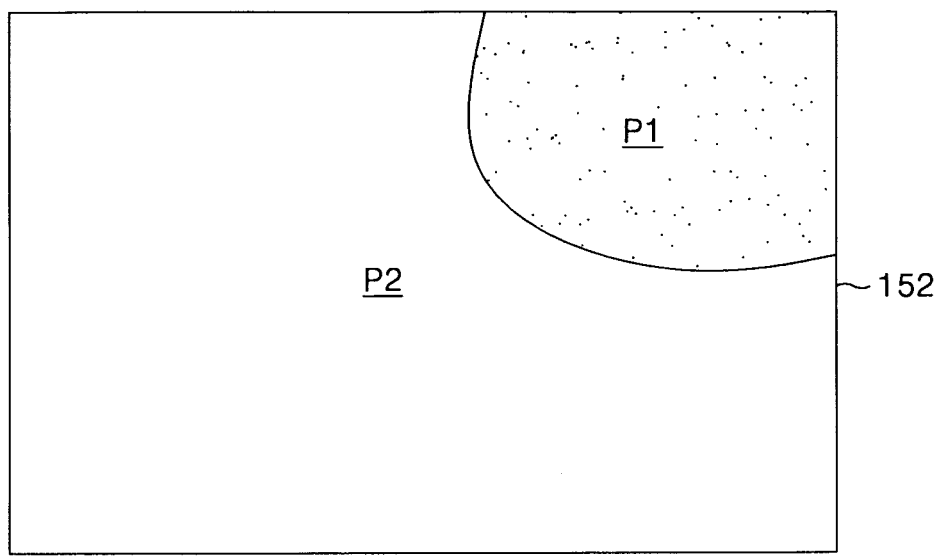
FIG. 8 is a mimetic diagram illustrating an illuminated area of a liquid crystal display device, and corresponding illumination area data as stored in memory.

For example, referring to FIG. 8, a illumination distribution data having an information on the non-illumination area P2 and the illumination area P1 may be stored in the form of a digital value of "0" and a digital value of "1" into the memory 206, respectively.

The illumination distribution data in the memory 206 is supplied to the timing controller 160 and the timing controller 160 generates the brightness control signal D1 to Dk using the illumination distribution data from the memory 206, and supplies the brightness control signal D1 to Dk to the backlight driver 210. The backlight driver 210 independently controls the amount of light from each of the plurality of light sources of the backlight 212 using the brightness control signal D1 to Dk.

Figure 9:
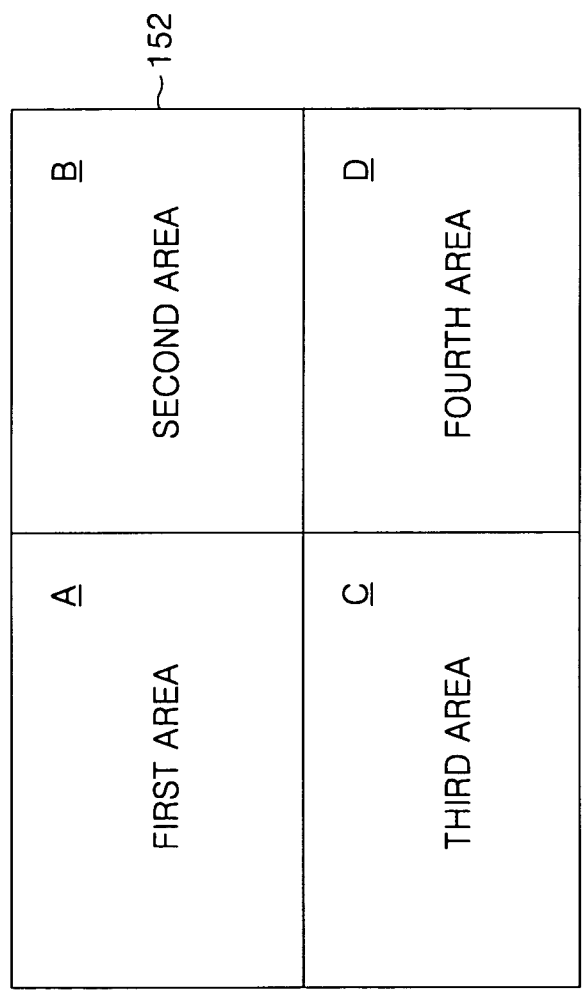
FIG. 9 is a diagram illustrating a liquid crystal display panel divided into four unit areas.

A case where the liquid crystal display panel is divided into four unit areas, A, B, C and D, with one light source corresponding to each of these unit areas, as illustrated in FIG. 9, will be described as follows.

The inverter controller 220 of the backlight driver 210 is supplied with the first to fourth control signals D1 to D4 from the timing controller 160 to control a first to a fourth inverter circuit portion 210a to 210d. In other words, the inverter controller 220 supplies a pulse with modulated (PWM) or a pulse amplitude modulated (PAM) control signal to each respective inverter circuit 210a-d. In doing so, the first brightness control signal D1 is supplied to the first inverter circuit portion 210a; the second brightness control signal D2 is supplied to the second inverter circuit portion 210b; the third brightness control signal D3 is supplied to the third inverter circuit portion 210c; and the fourth brightness control signal D1 is supplied to the fourth inverter circuit portion 210d. The first inverter circuit portion 210a drives the first light source 212a corresponding to the first area A of the liquid crystal display panel 152; the second inverter circuit portion 210b drives the second light source 212b corresponding to the second area B of the liquid crystal display panel 152, the third inverter circuit portion 210c drives the third light source 212c corresponding to the third area C of the liquid crystal display panel 152; and the fourth inverter circuit portion 210d drives the fourth light source 212d corresponding to the fourth area D of the liquid crystal display panel 152.

If the second area B is the illumination area P1, then the second inverter circuit portion 210b supplies a driving voltage (or a driving current) corresponding to the second brightness control signal D2 from the timing controller 160 to the second light source 212b, so that the second light source 212b supplies a light for compensating a deterioration of the contrast ratio reduced by the illumination of the second area B of the liquid crystal display panel 152. As a result, a deterioration of the contrast ratio of the illumination area P1 at the liquid crystal display panel 152 can be reduced.

Hereinafter, a method of fabricating a liquid crystal display panel containing a sensor TFT will be described in detail with reference to FIGS. 10A-14A, 10B-14B, and 10C-14C.

First, a gate metal layer is formed on a lower substrate 142 by a deposition technique such as a sputtering, etc. Next, the gate metal layer is patterned by a patterning technique such as a photolithography and etching process to provide gate patterns including the gate line 102, the gate electrode 108a of the first TFT 106, the gate electrode 108c of the second TFT 170, the first driving voltage supply line 152, the second driving voltage supply line 171, the gate electrode 108b of the sensor TFT 140 extended from the second driving voltage supply line 171, and the first lower storage electrode 121 shown in FIG. 10A-C. The second driving voltage supply line 171 may be integral to the first lower storage electrode 121 of the first storage capacitor 180 and the gate electrode 108b of the sensor TFT 140.

Figure 11A:
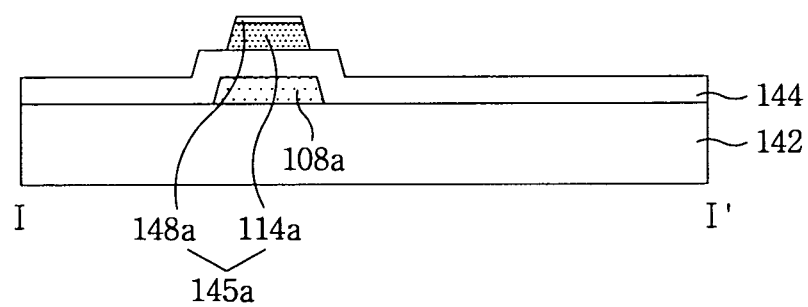
Figure 11B:
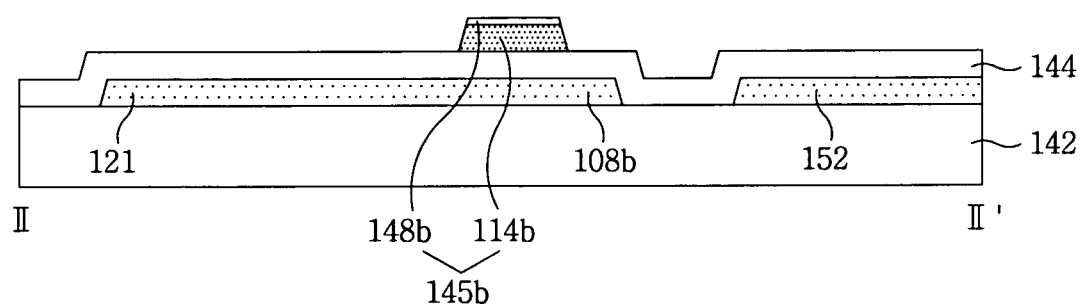
Figure 11C:
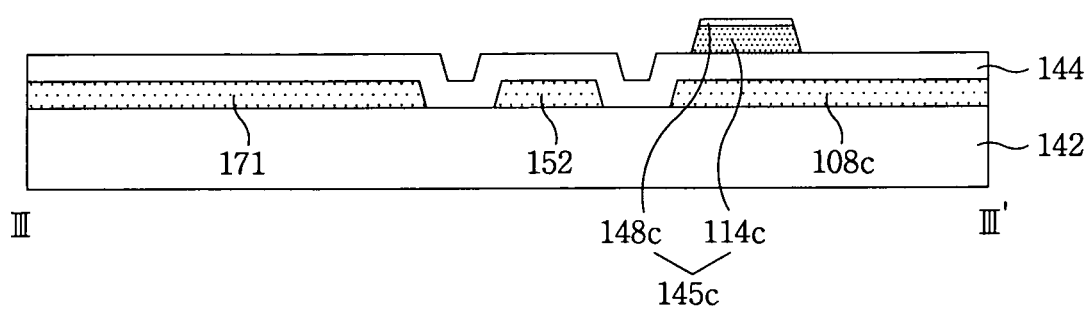

Referring to FIG. 11A-C, a gate insulating film 144 is formed on the lower substrate 142 provided with the gate patterns by a deposition technique such as the PECVD, etc. An amorphous silicon layer and an amorphous silicon layer doped with an $n^+$ impurity are sequentially disposed on the substrate 142 provided with the gate insulating film 144.

Figure 10A:
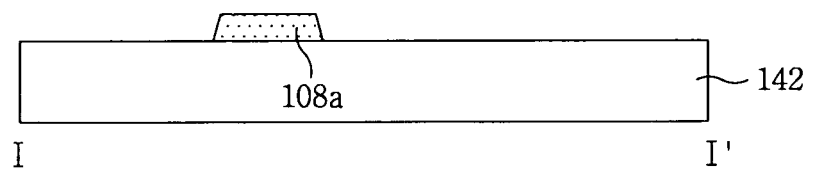
Figure 10B:
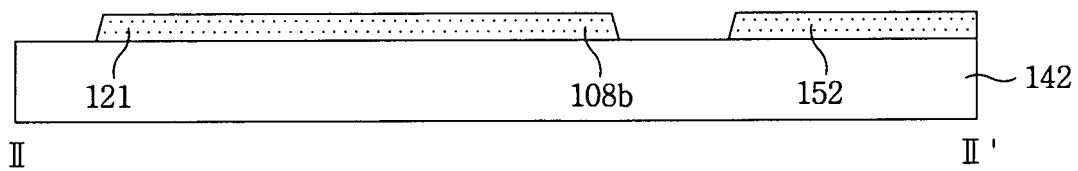
Figure 10C:
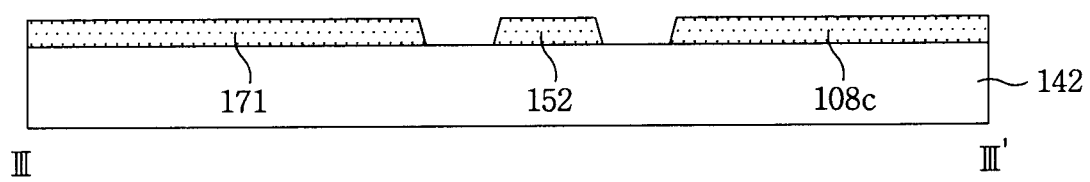

Next, the amorphous silicon layer and the amorphous silicon layer doped with an $n^+$ impurity are patterned by a photolithography process and an etching process using a mask to thereby provide the semiconductor patterns 145a, 145b and 145c corresponding to the first and the second TFT 106 and 170 and the sensor TFT 140, respectively illustrated in FIG. 10B. The semiconductor patterns 145a, 145b and 145c may be formed in a double-layer of the active layers 114a, 114b and 114c and the ohmic contact layers 148a, 148b and 148c.

Figure 12A:
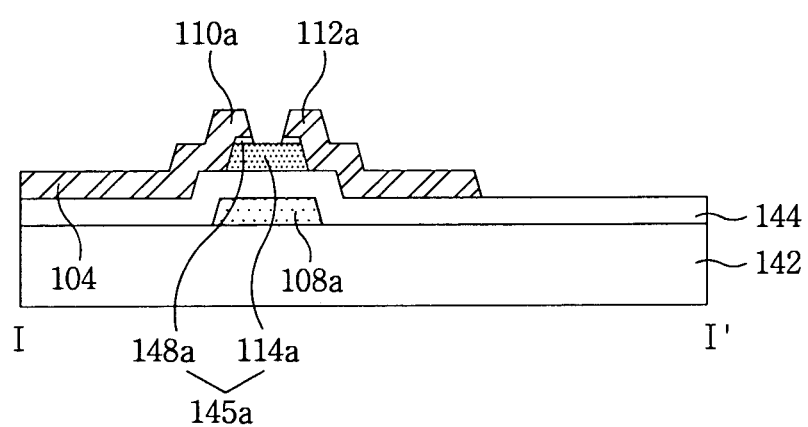
Figure 12B:
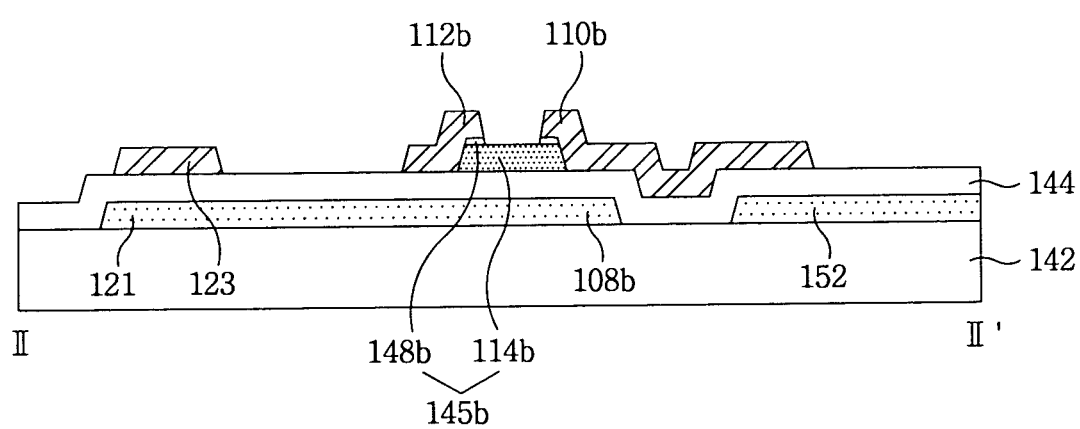
Figure 12C:
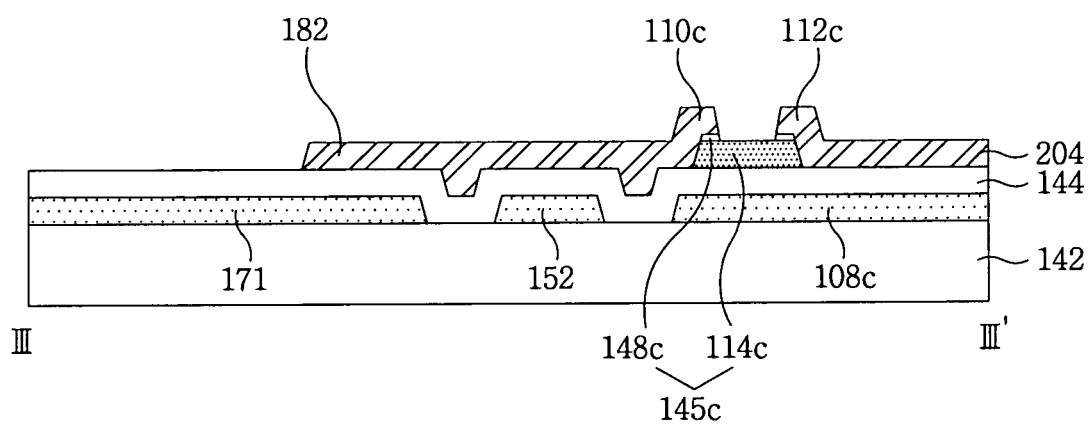

Referring to FIG. 12A-C, a source/drain metal layer is sequentially formed on the lower substrate 142 provided with the semiconductor patterns 145a, 145b and 145c. Next, source/drain patterns including the first upper storage electrode 123 overlapped with the first lower storage electrode 121 and the second storage electrode 182 connected to the drain electrode 112b of the sensor TFT 140 is formed by using, for example, a photolithography process and etching process, using a mask with a pattern for the data line 104, the source electrode 10a and the drain electrode 112a of the first TFT 106, the source electrode 110c and the drain electrode 112c of the second TFT 170, the source electrode 10b and the drain electrode 112b of the sensor TFT 140.

Figure 13A:
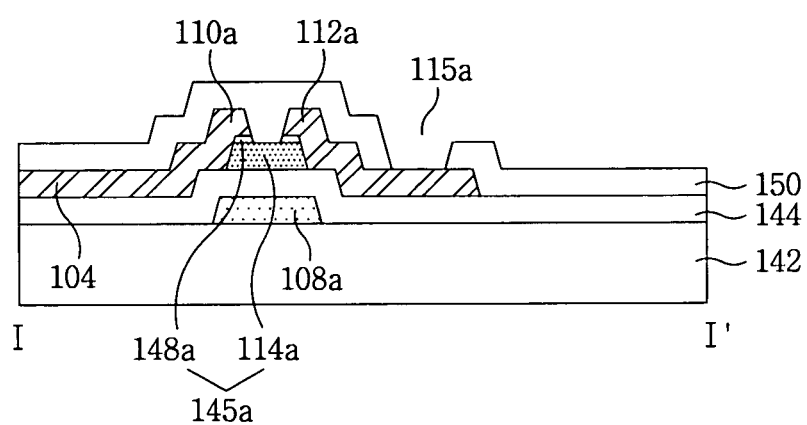
Figure 13B:
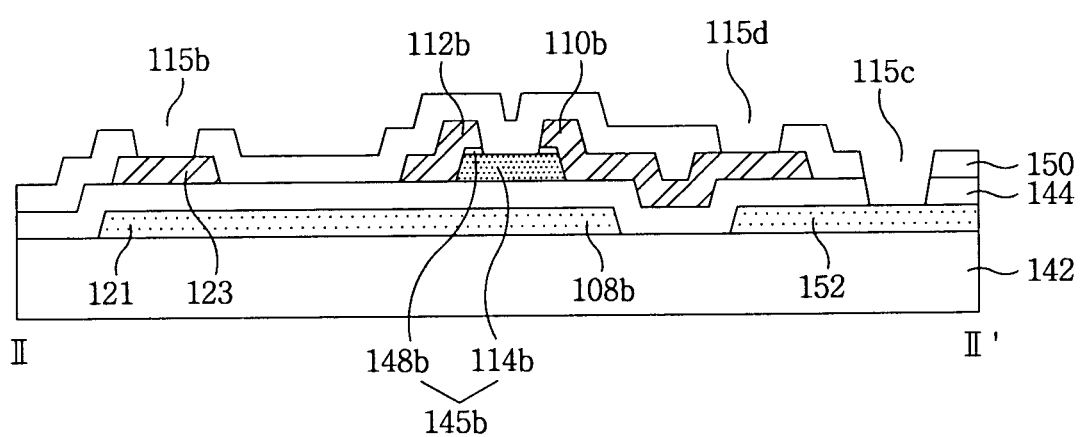
Figure 13C:
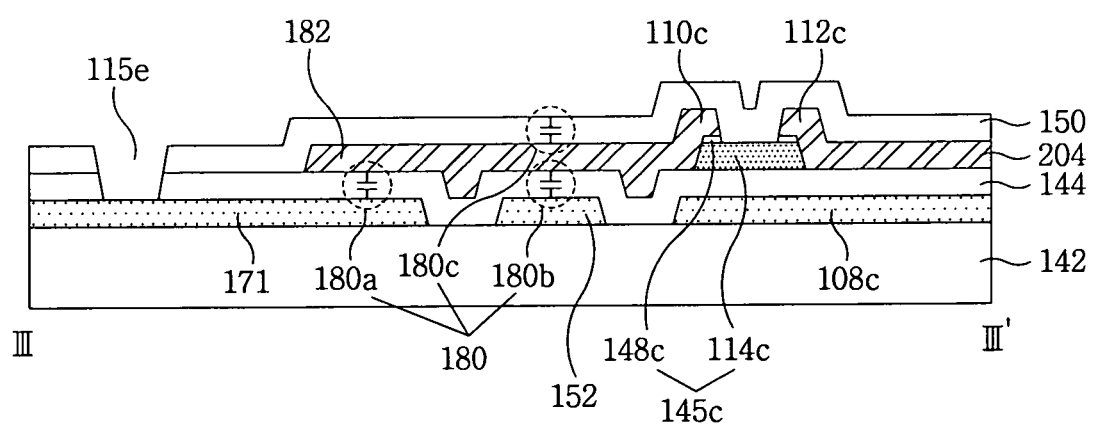

Referring to FIG. 13A-C, a protective film 150 may be entirely formed on the gate insulating film 144 provided with the source/drain patterns by a deposition technique such as the PECVD, etc. Then the protective film 150 is patterned by a photolithography and etching process to thereby provide a first contact hole 115a for exposing the drain electrode 112a of the first TFT 106, a second contact hole 115b for exposing the first upper storage electrode 123, a third contact hole 115c for exposing the first driving voltage supply line 152, a fourth contact hole 115d for exposing the source electrode 110b of the sensor TFT 140, and a fifth contact hole 115e for exposing the second driving voltage supply line 171 of the second storage capacitor 180.

Figure 14A:
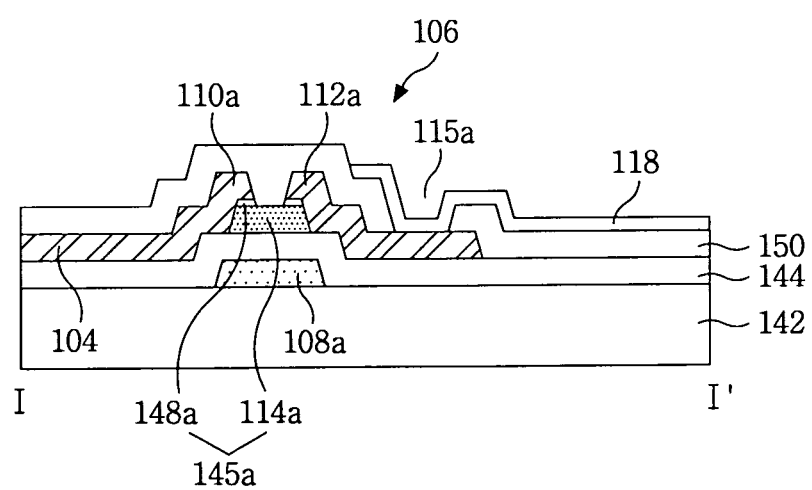
Figure 14B:
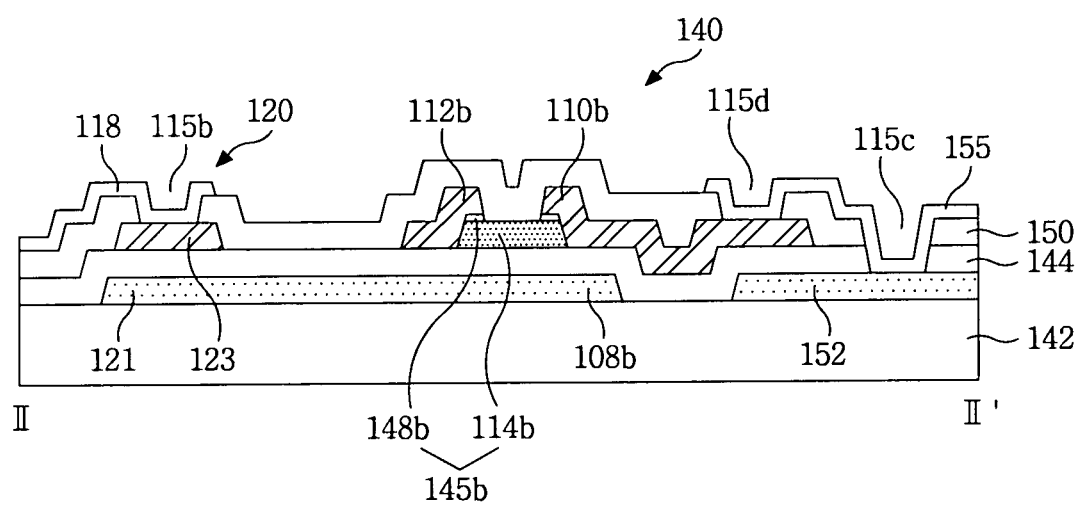
Figure 14C:
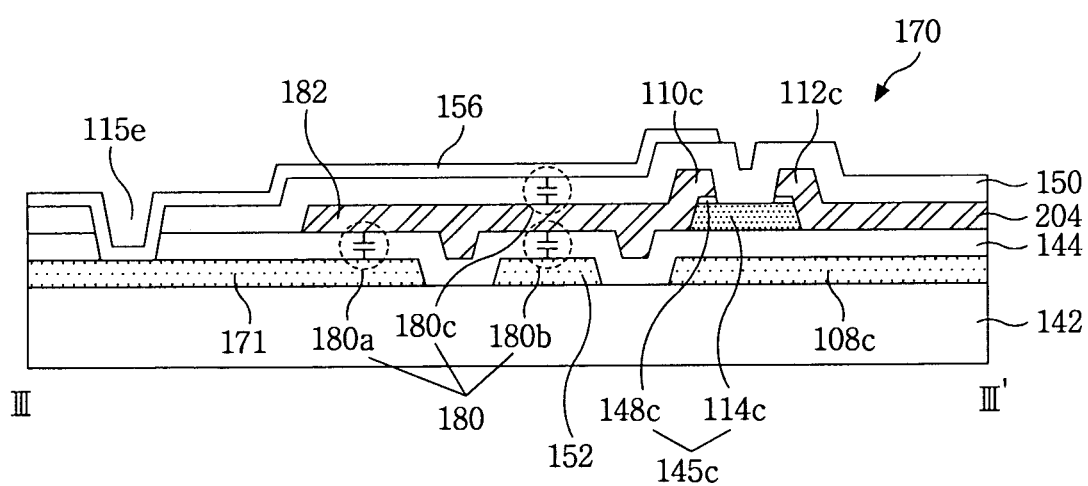

Referring to FIG. 14A-C, a transparent electrode material may be entirely disposed on the protective film 150 by a deposition technique such as the sputtering, etc. Then the transparent electrode material is patterned by a photolithography and etching process to thereby provide the pixel electrode 118, the first transparent electrode pattern 155, and the second transparent electrode pattern 156.

The pixel electrode 118 is connected, via the first contact hole 115a, to the drain electrode 112a of the first TFT 106 and is connected, via the second contact hole 1115b, to the first upper storage electrode 123.

The first transparent electrode pattern 155 is connected, via the third contact hole 115c, to the first driving voltage supply line 152 and is connected, via the fourth contact hole 115d, to the source electrode 10b of the sensor TFT 140.

The second transparent electrode pattern 156 is partially overlapped with the second storage electrode 182 and is connected, via the fifth contact hole 115e, to the first driving voltage supply line 171. Accordingly, a thin film transistor array substrate having the sensor TFT is formed.

Next, in a separate process a black matrix is formed, which divides a color filter substrate into liquid crystal cell areas and prevents light leakage when the liquid crystal display device is driven. Further, the color filter array substrate containing a color filter, etc. is provided at the liquid crystal area defined by the black matrix. The color filter array substrate and the thin film transistor array substrate are then joined to each other to form the liquid crystal display panel containing the sensor TFT.

As described above, in the liquid crystal display device, the fabricating method and the driving method thereof, it is not necessary to add an external photo sensor because at least one photosensor is integrated within the liquid crystal display panel. Thus, cost is reduced.

Also, the liquid crystal display device includes light sources that arranged in a matrix formation at the rear side of the liquid crystal display panel 152 and are capable of being independently driven to thereby supply light having a light distribution corresponding to the illumination distribution to the liquid crystal display panel. Accordingly, brightness of the light sources corresponding to the illumination area P1 of the liquid crystal display panel can be increased to thereby prevent contrast ratio deterioration at the illumination area.

Although the present invention has been explained by the embodiments shown in the drawings described above, it will be understood by the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
    a plurality of photo sensing devices formed on a TFT array substrate that sense an external light irradiated into a liquid crystal display panel, wherein the liquid crystal panel has a plurality of unit areas divided in a matrix form;
    a plurality of gate lines and a plurality of data lines crossing each other to define a plurality of pixel areas;
    a gate driver that sequentially provides a scan signal to the plurality of gate lines to select horizontal lines of the liquid crystal display device supplied with data signals;
    a first thin film transistor connected to the $n^{th}$ gate line and one of the data lines;
    an integrated circuit portion that reads out sensing signals corresponding to an illumination distribution by the external light in accordance with a sensing result by each of the photo sensing devices;
    a backlight having a plurality of light sources that independently supply light to the liquid crystal display panel in accordance with the illumination distribution of the plurality of unit areas; and
    a backlight driver that drives the backlight,
    wherein the photo sensing device includes a sensor thin film transistor that senses an external light, a first driving voltage supply line that supplies a first driving voltage to the sensor thin film transistor, a second driving voltage supply line that supplies a second driving voltage to the sensor thin film transistor and a second storage capacitor that stores a signal voltage sensed by the sensor thin film transistor,
    wherein the photo sensing device further includes a second thin film transistor connected to the n–$1^{th}$ gate line and a read-out line and supplying the sensing signal to the integrated circuit portion through the read-out line,
    wherein the scan signal is sequentially supplied to the second thin film transistor through the n–$1^{th}$ gate line and the first thin film transistor through the $n^{th}$ gate line from the gate driver,
    wherein the n–$1^{th}$ gate line and the $n^{th}$ gate line are commonly connected to the gate driver,
    wherein each of the light sources is arranged in the matrix form corresponding to each of the unit areas.

2. The liquid crystal display device as claimed in claim 1, further comprising:
    an analog-digital converter that converts an analog signal from each of the photo sensing devices into a digital signal; and
    a memory that stores an illumination distribution data corresponding to the digital signals from the analog-digital converter; and
    a timing controller that generates a control signal for controlling the plurality of light sources based on the illumination distribution data and supplies the control signal to the backlight driver.

3. The liquid crystal display device as claimed in claim 1, wherein the liquid crystal display panel further includes:
    a color filter array substrate joined to the TFT array substrate; and
    a liquid crystal between the color filter array substrate and the TFT array substrate.

4. The liquid crystal display device as claimed in claim 1, wherein the TFT array substrate includes:
    a pixel electrode connected to the first thin film transistor and positioned at the pixel area; and
    a first storage capacitor that stores a pixel voltage charged into the pixel electrode.

5. The liquid crystal display device as claimed in claim 1, wherein the sensor thin film transistor includes:
    a first gate electrode formed on a substrate and connected to the second driving voltage supply line;
    a gate insulating film that covers the first gate electrode;
    a first semiconductor pattern overlapping the first gate electrode with the gate insulating film between them;
    a first source electrode electrically connected to the first semiconductor pattern and electrically connected to the first driving voltage supply line; and
    a first drain electrode opposed to the first source electrode.

6. The liquid crystal display device as claimed in claim 5, further including:
    a protective film that covers the sensor thin film transistor;
    a first hole passing through the protective film and the gate insulating film to expose the first driving voltage supply line; and
    a transparent electrode pattern formed to cover the first hole, and
    wherein the first source electrode and the first driving voltage supply line are electrically connected to each other by the transparent electrode pattern.

7. The liquid crystal display device as claimed in claim 1, wherein the second thin film transistor includes:
- a second gate electrode extended from the gate line;
- a second semiconductor pattern overlapped with the second gate electrode with the gate insulating film between them;
- a second source electrode electrically connected to the second semiconductor pattern; and
- a second drain electrode connected to the sensing signal transmission line.

8. The liquid crystal display device as claimed in claim 4, wherein the first thin film transistor includes:
- a third gate electrode extended from the gate line;
- a third semiconductor pattern that overlaps the third gate electrode with the gate insulating film between them;
- a third source electrode electrically connected to the third semiconductor pattern and extended from the data line; and
- a third drain electrode connected to the pixel electrode.

9. The liquid crystal display device as claimed in claim 1, further including:
- a data driver that supplies the data signals to the data line of the liquid crystal display panel.

10. A method of driving a liquid crystal display device including a plurality of gate lines and a plurality of data lines crossing each other to define a plurality of pixel areas and a first thin film transistor connected to the $n^{th}$ gate line and one of the data lines, comprising:
- sensing an external light irradiated onto a liquid crystal display panel using a photo sensing device provided within the liquid crystal display device, wherein the liquid crystal panel has a plurality of unit areas divided in a matrix form;
- measuring an illumination distribution corresponding to the external light in accordance with a result of the sensing by the photo sensing device; and
- adjusting a light amount supplied to the liquid crystal display panel in accordance with the illumination distribution of the plurality of unit areas,
- wherein the photo sensing device includes a sensor thin film transistor that senses an external light, a first driving voltage supply line that supplies a first driving voltage to the sensor thin film transistor, a second driving voltage supply line that supplies a second driving voltage to the sensor thin film transistor and a second storage capacitor that stores a signal voltage sensed by the sensor thin film transistor,
- wherein the photo sensing device further includes a second thin film transistor connected to the n-1$^{th}$ gate line and a read-out line and supplying a sensing signal to a read-out circuit,
- wherein a scan signal is sequentially supplied to the second thin film transistor through the n-1$^{th}$ gate line and the first thin film transistor through the n$^{th}$ gate line from a gate driver,
- wherein the gate driver sequentially provides a scan signal to the plurality of gate lines to select horizontal lines of the liquid crystal display device supplied with data signals,
- wherein the n-1$^{th}$ gate line and the n$^{th}$ gate line are commonly connected to the gate driver,
- wherein the light amount is emitted from each of light sources corresponding to each of the unit areas.

11. The method of driving the liquid crystal display device as claimed in claim 10, wherein adjusting the light amount in accordance with the illumination distribution includes:
- converting a signal sensed by the photo sensing device into a digital signal;
- providing an illumination distribution data corresponding to the digital signal; and
- providing a control signal that corresponds to the illumination distribution data; and
- selectively adjusting the light amount from each of the plurality of light sources according to the control signal.

12. The method of driving the liquid crystal display device as claimed in claim 11, wherein selectively adjusting the light amount includes:
- supplying a first amount of light to an area where the external light is irradiated onto the liquid crystal display panel; and
- supplying a second amount of light to an area other than an area where the external light is irradiated.

* * * * *